United States Patent
Park

(10) Patent No.: US 8,345,547 B2
(45) Date of Patent: Jan. 1, 2013

(54) CHANNEL ACCESS MECHANISM FOR WIDE CHANNELS USED IN OVERLAPPING NETWORKS

(75) Inventor: Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 12/861,086

(22) Filed: Aug. 23, 2010

(65) Prior Publication Data

US 2012/0044879 A1 Feb. 23, 2012

(51) Int. Cl.
*H04L 12/26* (2006.01)

(52) U.S. Cl. ....................................................... 370/229

(58) Field of Classification Search .......... 370/229–231, 370/235, 310, 431, 445, 447, 448; 709/227–229
See application file for complete search history.

(56) References Cited

U.S. PATENT DOCUMENTS

| | | | | |
|---|---|---|---|---|
| 7,680,150 B2* | 3/2010 | Liu et al. | ........................ | 370/469 |
| 7,684,367 B2* | 3/2010 | Yun et al. | ....................... | 370/329 |
| 7,701,962 B2* | 4/2010 | Utsunomiya et al. | ......... | 370/445 |
| 7,983,298 B2* | 7/2011 | Nanda et al. | ................... | 370/468 |
| 2007/0297353 A1* | 12/2007 | Habetha et al. | ................ | 370/310 |
| 2010/0190520 A1* | 7/2010 | Reumerman et al. | ......... | 455/522 |
| 2011/0096747 A1* | 4/2011 | Seok | .............................. | 370/329 |
| 2011/0317674 A1* | 12/2011 | Park et al. | ...................... | 370/338 |

OTHER PUBLICATIONS

Kim, Youhan, "Enhanced CCA for Non-Primary Channels Using Guard Interval," submitted Jan. 7, 2010, doc.: IEEE 802.11-10/0012r0, pp. 1-13.

* cited by examiner

*Primary Examiner* — Dmitry H Levitan
(74) *Attorney, Agent, or Firm* — Kacvinsky Daisak PLLC

(57) ABSTRACT

When a device is contending for the right to transmit on a wide channel (composed of a primary narrow channel and one or more secondary narrow channels), it may halt its backoff counter if one of the secondary channels is detected as busy, and restart the backoff counter from its halted value when all the channels are again detected as idle. Some embodiments may use a guard interval detection technique to aid in sensing whether the secondary channels are busy.

16 Claims, 3 Drawing Sheets

CHANNEL ACCESS MECHANISM FOR WIDE CHANNELS USED IN OVERLAPPING NETWORKS

BACKGROUND

Some wireless networks, such as those complying with IEEE standard 802.11a/n, may use 'wide' channels with a bandwidth of 40 MHz, each wide channel composed of two legacy 'narrow' channels having a width of 20 MHz each. Some other wireless networks, such as those complying with IEEE standard 802.11ac, may use wide channels with a width of 80 MHz, each composed of four legacy 20 MHz channels. In both cases, before a device may transmit on a wide channel, it must determine that all the associated narrow channels are idle so that the transmission won't interfere with another device that might be using one or more of those narrow channels. To reduce the chance that multiple devices will try to seize the same idle channels at the same time and thereby try to transmit at the same time, each device waits for a randomly selected backoff period (as measured by a backoff counter) before transmitting on the wide channel, assuming the associated narrow channels are still idle after the backoff period. The maximum allowable backoff period may be defined by a 'contention window'. A failure by a particular device to access the medium in this manner, a situation that might occur frequently in a heavily congested network, may result in increasing the size of the device's contention window and thereby increasing its average backoff time. Further, if a device senses that one of the channels becomes busy during the backoff countdown, the count may be restarted from the beginning. These two actions may help reduce network congestion, but they make it even less likely that the device will gain control of the channel quickly, since other devices with shorter backoff times will acquire control of the channel first.

When two separate networks with overlapping coverage areas are using some of the same narrow channels, the same protocols may be followed to reduce the chance that a transmission in one network will interfere with a reception in the other network. However, one network may be at a disadvantage in this situation. For example, if one network has a lot of data traffic, the contention windows of the devices in that network are likely to increase in size more than in the other network. Devices with larger average backoff times (due to the larger contention windows) are less likely to get the channel than devices with shorter average backoff times. Alternatively, devices that require four narrow channels are less likely to find all those channels idle than are devices that only require two narrow channels.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
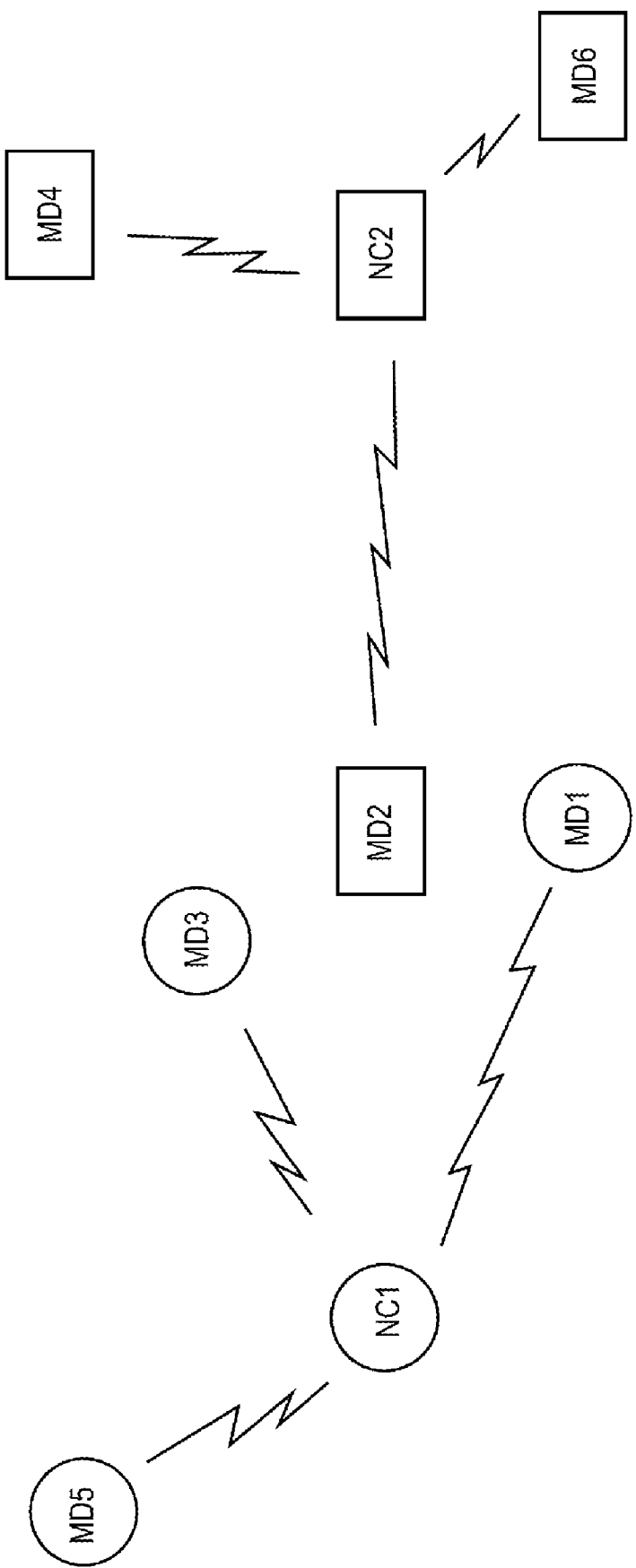
FIG. 1 shows overlapping networks, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

As used within this document, the term "network controller" is intended to cover devices that schedule and control, at least partially, wireless communications by other devices in the network. A network controller may also be known as a base station (BS), access point (AP), central point (CP), or any other term that may arise to describe the functionality of a network controller.

As used within this document, the term "mobile device" is intended to cover those devices whose wireless communications are at least partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during such communications, but movement is not required.

As used in this document, a 'narrow' channel is a channel having a pre-defined contiguous bandwidth in the frequency spectrum, while a 'wide' channel is a channel having the combined portions of the frequency spectrum occupied by multiple ones of these narrow channels. That is, multiple specified narrow channels may collectively constitute a specified wide channel. In some embodiments, a wide channel contains only contiguous narrow channels, but in other embodiments these narrow channels don't have to be contiguous, i.e., two narrow channels that are included in the wide channel may be separated in the frequency spectrum by one or more narrow channels that are not included in the wide channel. For simplicity of description, the narrow channels may be described as having a 20 MHz bandwidth, while the wide channels may be described as having a bandwidth that is an integer multiple of 20 MHz, for example 40 or 80 MHz, but other embodiments may use narrow-channel bandwidths other than 20 MHz. Within this document the term 'channel' refers to a narrow channel unless indicated as a wide channel.

In various embodiments, a device may use a backoff counter when contending for the right to transmit on a wide channel (composed of a primary narrow channel and one or more secondary narrow channels). The device may start the counter and not transmit until after the counter expires. Term 'backoff' counter is used to indicate that the counter is used to help the device 'back off' from its chance to transmit (it waits to transmit) until the counter expires. The device may have other counters that are used for other purposes. If one of the secondary narrow channels becomes busy while the backoff counter is counting down, the backoff counter may be halted. When all the narrow channels are again detected as idle, the backoff counter may be restarted from its halted value, rather than starting a new backoff period with a new count value as is done in conventional systems. Some embodiments may use a guard interval detection technique to aid in sensing whether the secondary channels are idle or busy. Although described as counting down (presumably to zero), a counter may be programmed to count up or down from any value to any other value before expiring. This variation is well within the ability of a person of ordinary skill in the art to design.

FIG. 1 shows overlapping networks, according to an embodiment of the invention. One network is indicated by network controller NC1 communicating wirelessly with mobile devices MD1, MD3, and MD5. A second network is indicated by network controller NC2 communicating wirelessly with mobile devices MD2, MD4, and MD6. It is assumed that MD1 and MD2 are located close enough to each other that the communications of one may be received by the other with enough signal strength to cause interference', thus the term 'overlapping networks'. Since signal strength may depend on many things unrelated to physical distance from the network controller, it is not necessary that each device be in a predefined physical area for the networks to be considered overlapping. It is possible that other devices in the two networks may also be able to cause internetwork interference, but MD1 and MD2 are sufficient to illustrate the principle.

In the example, it may be further assumed that device MD1 intends to communicate with another device in its own network (e.g., NC1), over a wide channel consisting of multiple narrow channels, and that device MD2 is capable of communicating within its own network using at least one of those narrow channels. Thus, MD1 and MD2 may occasionally want to use the same narrow channels at the same time, which would cause internetwork interference.

Figure 2:
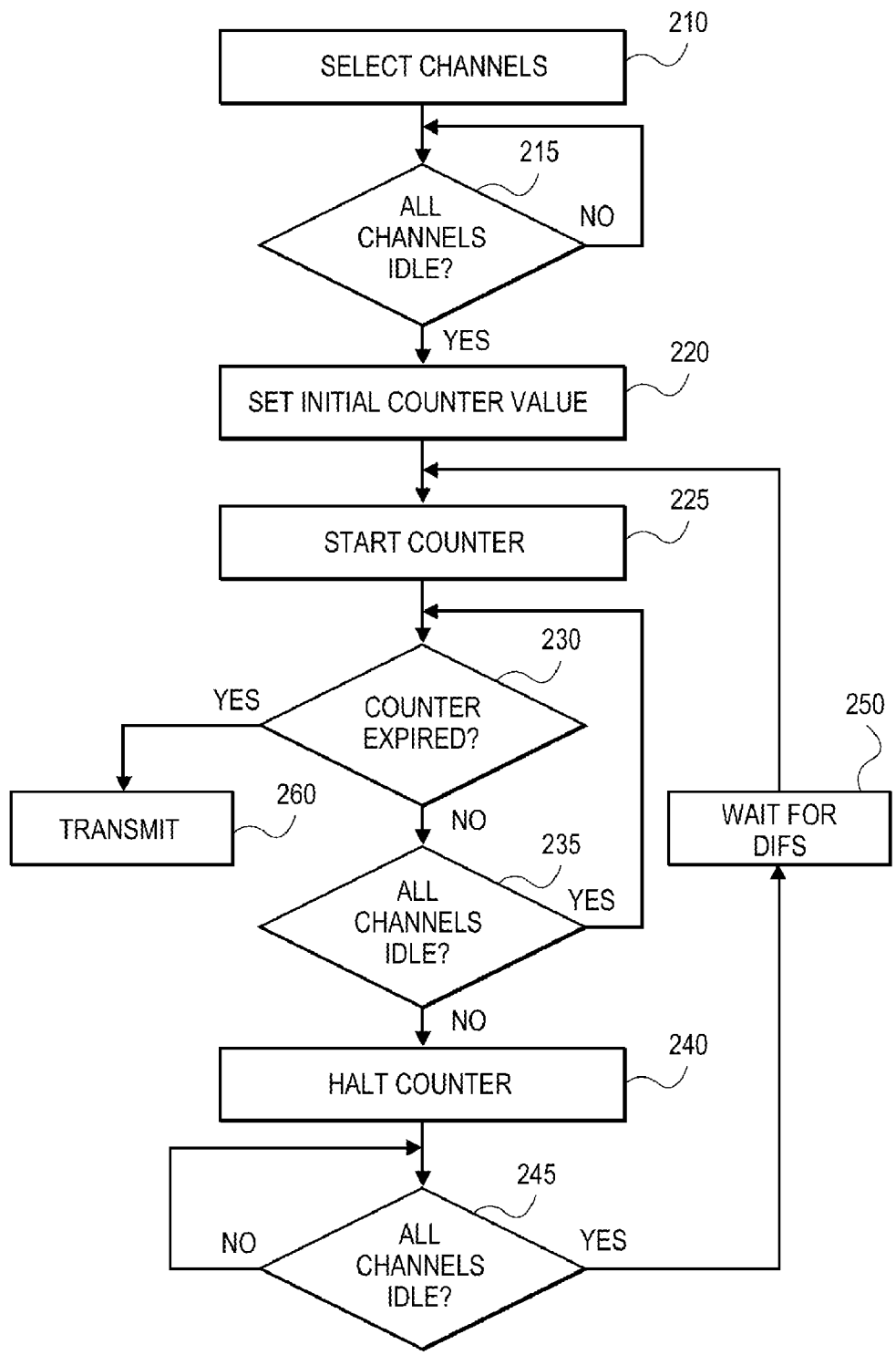
FIG. 2 shows a flow diagram of a method of gaining access to the wireless medium for a transmission, according to an embodiment of the invention.

FIG. 2 shows a flow diagram of a method of gaining access to the wireless medium for a transmission, according to an embodiment of the invention. In the illustrated example, it is assumed that a device (for example, MD1 in FIG. 1) intends to transmit to another device during a contention-based access period over a wide channel consisting of multiple narrow channels. In many networks that use wide channels, a device has several wide channels to choose from, each consisting of a different set of pre-defined narrow channels. Therefore, this process may begin at 210 by selecting the specific narrow channels by choosing a wide channel intended to be used in the transmission. For the rest of this description of FIG. 2, the term 'channel' indicates a narrow channel unless specifically designated as a wide channel.

In some embodiments, the device will not proceed until it determines at 215 that all the channels selected at 210 are idle. Other embodiments may set the counter value (see 220) before monitoring to see if all the selected channels are idle. The term 'idle' indicates that no other device is using the channel, or if it is, the received signal detected at this device is too weak to be considered a problem. Conversely, the term 'busy' indicates that another device is using the channel and that the received signal is stronger than a certain threshold. In some techniques, detecting a certain level of energy on the channel is enough to consider the channel busy, even if the signal can't be identified as coming from another device. In other techniques, the channel is considered busy once a transmitted preamble is detected, and will be considered busy until the associated transmission stops. Some embodiments may combine both techniques. The end of the transmission may be detected by detecting the guard interval of the OFDM symbols. Guard interval detectors may be implemented in any feasible manner.

At 220, an offset counter in the device may be programmed to a certain value, so that the counter will have to count for a certain minimum period of time before the counter expires. The offset counter may be implemented in hardware, software, a combination of the two, or any other feasible means. The counter may then be started at 225. Expiration of the counter is shown at 230.

As long as the selected channels remain idle, as determined at 235, the counter may continue its countdown and the process may cycle through loop 230-235. However, if one or more of the channels becomes busy (for example, if another device begins transmitting on a channel during the countdown), the counter may be halted at 240, and remain halted until all channels are again detected as being idle at 245. When all the channels are again idle, the counter may be restarted at 225. In some embodiments, the device may delay for a certain period of time, after detecting all channels idle, before restarting the counter. A distributed interframe space, or DIFS, is shown as the delay period at 250 in this example, but other delay values may also be used.

The device may continue in this manner with operations 225 through 250, until the counter finally expires at 230. In some instances, the counter may be halted and restarted multiple times due to traffic being detected on one or more of the channels. After the counter expires, the device may take control of the wide channel by transmitting over it at 260. In some instances, the transmission may only use a subset of the selected narrow channels, but in other instances it may use all of them.

In some embodiments, the device may monitor the selected channels continuously throughout this process to determine whether they are idle or busy. In other embodiments, the idle/busy status may be checked at periodic intervals. Various techniques may be used for such monitoring.

Figure 3:
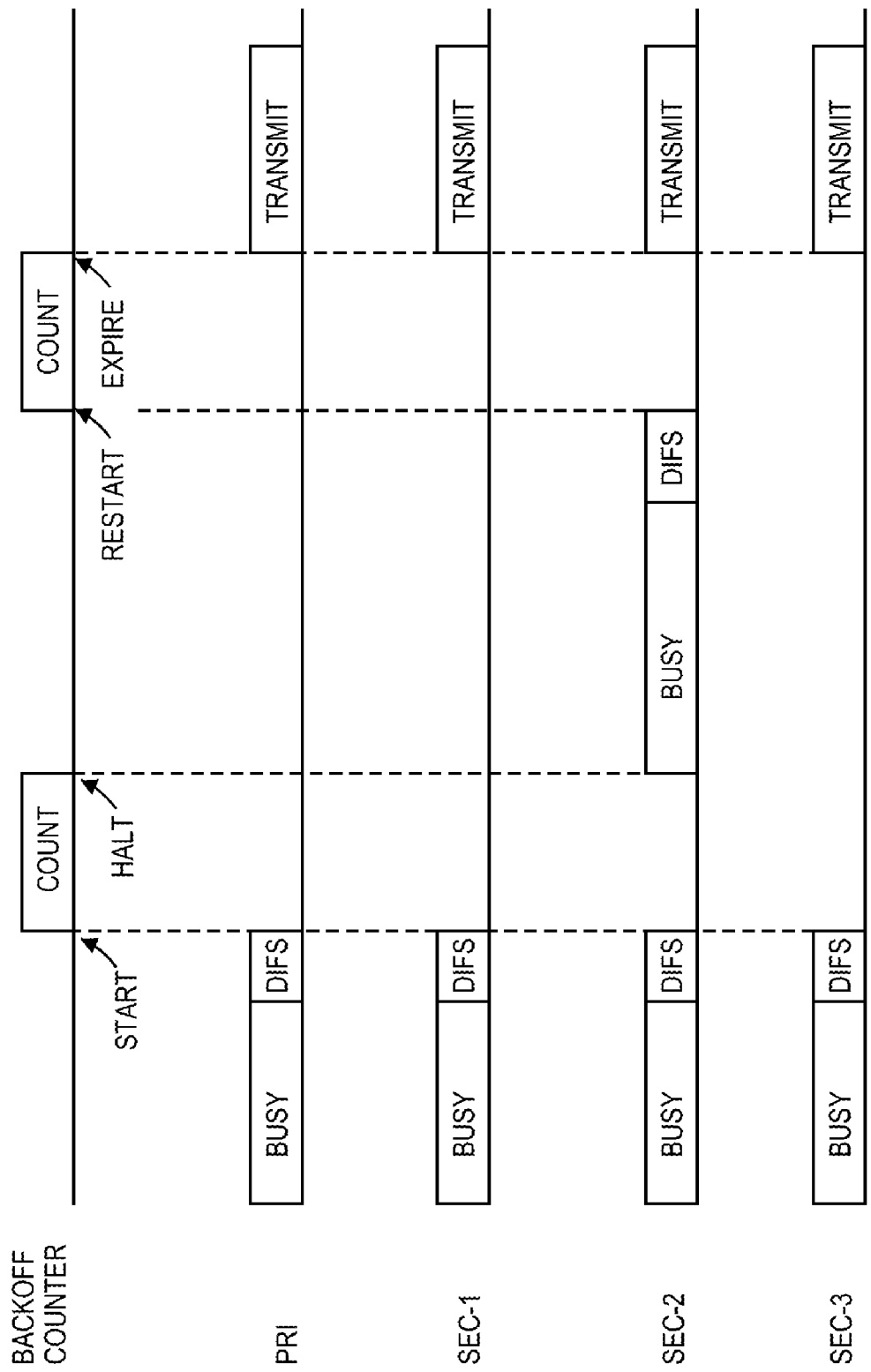
FIG. 3 shows a timing diagram of a process for accessing a wide channel, according to an embodiment of the invention.

FIG. 3 shows a timing diagram of a process for accessing a wide channel, according to an embodiment of the invention. In the example, the wide channel is composed of four narrow channels (one primary channel labeled PRI, and three secondary channels labeled SEC-1, SEC-2, SEC-3). In a typical scenario, each narrow channel may have a bandwidth of 20 MHz, giving this wide channel a bandwidth of 80 MHz, but other channel widths may also be used. In the example, all four narrow channels are initially shown as busy because some device is transmitting over the wide channel. After the transmission is complete, an interval consisting of one DIFS is shown.

At this point, a device wishing to transmit over the wide channel may start its backoff counter. After the backoff counter expires (counts down completely), the device may then transmit if each of the four narrow channels is still idle. Before starting the countdown, the counter may be pre-set to a randomly or pseudo-randomly selected value (within the limits of the currently selected contention window).

However, while the backoff counter is still counting, the example shows a transmission being detected on the secondary channel SEC-2. This is most likely to come from a device in another network, since the devices in the current network will be under the control of the same network controller, which can prevent such an unpredicted transmission. But in some instances the transmission may be from the current network. When the transmission on SEC-2 is detected, the backoff counter may be halted, and remain halted until all four channels are idle again. After all four channels are detected as idle, another DIFS is shown, after which the counter may be started again.

Once the backoff counter expires, and all four channels are still idle, the device may begin transmitting on the wide channel, thus achieving its initial purpose of gaining control of the wide channel for a transmission. This example shows only a single intervening transmission, on a single narrow channel, during the countdown period. But other examples may have multiple such intervening transmissions, and they may occur on multiple secondary channels. Sometimes two or more channels will be simultaneously occupied by the same wide-channel transmission. Sometimes, an intervening transmission on a second narrow channel will be detected before the intervening transmission on the first narrow channel is finished.

But in all those cases, the backoff counter should be counting only when all the associated narrow channels are detected as idle, and the backoff counter should be restarted from its halted value rather than beginning a new countdown, after the counter is halted by an intervening transmission from another device.

The foregoing description is intended to be illustrative and not limiting. Variations will occur to those of skill in the art. Those variations are intended to be included in the various embodiments of the invention, which are limited only by the scope of the following claims.

What is claimed is:

1. A method, comprising:
   detecting that each narrow channel of a wide channel is idle;
   starting a backoff counter subsequent to said detecting that each of the narrow channels is idle;
   detecting, subsequent to said starting, that at least one of the narrow channels is busy;
   halting the backoff counter in response to said detecting that said at least one of the narrow channels is busy;
   detecting, subsequent to said halting, that each of the narrow channels is idle again; and
   restarting the backoff counter from its halted value subsequent to said detecting that each of the narrow channels is idle again.

2. The method of claim 1, further comprising:
   detecting an expiration of the backoff counter; and
   transmitting on the wide channel in response to said detecting the expiration.

3. The method of claim 1, wherein said restarting the backoff counter comprises delaying by a distributed interframe space (DIFS) before said restarting.

4. The method of claim 1, wherein said detecting that at least one of the narrow channels is busy comprises using a guard interval detection technique.

5. The method of claim 1, wherein said detecting that each of the narrow channels is idle comprises using at least one of an energy detection technique and a preamble detection technique.

6. An apparatus, comprising:
   a wireless communications device having a processor, a radio, and a backoff counter, the device to:
   detect that each narrow channel of a wide channel is idle;
   start the backoff counter subsequent to said detecting that each of the narrow channels is idle;
   detect, subsequent to said starting, that at least one of the narrow channels is busy;
   halt the backoff counter in response to said detecting that said at least one of the narrow channels is busy;
   detect, subsequent to said halting, that each of the narrow channels is idle again; and
   restart the backoff counter from its halted value subsequent to said detecting that each of the narrow channels is idle again.

7. The apparatus of claim 6, wherein the device is further to:
   detect an expiration of the backoff counter; and
   transmit on the wide channel in response to said detecting the expiration.

8. The apparatus of claim 6, wherein said restarting the backoff counter comprises delaying by a distributed interframe space (DIFS) before said restarting.

9. The apparatus of claim 6, wherein said detecting that each of the narrow channels is idle comprises using a guard interval detection technique.

10. The apparatus of claim 6, wherein said detecting that at least one of the narrow channels is busy comprises using at least one of an energy detection technique and a preamble detection technique.

11. The apparatus of claim 6, further comprising an antenna coupled to the radio.

12. An article comprising
   a computer-readable storage medium, wherein the medium is not a signal, that contains instructions, which when executed by one or more processors result in performing operations comprising:
   detecting that each narrow channel of a wide channel is idle;
   starting a backoff counter subsequent to said detecting that each of the narrow channels is idle;
   detecting, subsequent to said starting, that at least one of the narrow channels is busy;
   halting the backoff counter in response to said detecting that said at least one of the narrow channels is busy;
   detecting, subsequent to said halting, that each of the narrow channels is idle again; and restarting the backoff counter from its halted value subsequent to said detecting that each of the narrow channels is idle again.

13. The article of claim 12, wherein the operations further comprise:

detecting an expiration of the backoff counter; and
   transmitting on the wide channel in response to said detecting the expiration.

14. The article of claim 12, wherein the operation of restarting the backoff counter comprises delaying by a distributed interframe space (DIFS) before said restarting.

15. The article of claim 12, wherein the operation of detecting that at least one of the narrow channels is busy comprises using a guard interval detection technique.

16. The article of claim 12, wherein the operation of detecting that each of the narrow channels is idle comprises using at least one of an energy detection technique and a preamble detection technique.

* * * * *